(12) United States Patent
Yoshida et al.

(10) Patent No.: US 6,717,329 B2
(45) Date of Patent: Apr. 6, 2004

(54) DRIVE MECHANISM EMPLOYING ELECTROMECHANICAL TRANSDUCER AND METHOD FOR CONTROLLING THE DRIVE MECHANISM

(75) Inventors: Ryuichi Yoshida, Sakai (JP); Junichi Tanii, Izumi (JP); Yasuhiro Okamoto, Tondabayashi (JP); Tomoyuki Yuasa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 70 days.

(21) Appl. No.: 10/053,186

(22) Filed: Jan. 18, 2002

(65) Prior Publication Data
US 2004/0012304 A1 Jan. 22, 2004

(30) Foreign Application Priority Data
Jan. 22, 2001 (JP) ......................... 2001-013048

(51) Int. Cl.⁷ .......................... H01L 41/06; H01L 41/08
(52) U.S. Cl. ............... 310/316.02; 310/316.01; 310/317; 310/323.02
(58) Field of Search ................ 310/316.02, 316.01, 310/323.02, 317

(56) References Cited

U.S. PATENT DOCUMENTS

| | | | | |
|---|---|---|---|---|
| 5,329,200 A | * | 7/1994 | Zaitsu | 310/316.01 |
| 5,589,723 A | * | 12/1996 | Yoshida et al. | 310/328 |
| 5,786,654 A | * | 7/1998 | Yoshida et al. | 310/328 |
| 6,051,909 A | * | 4/2000 | Shinke et al. | 310/316.01 |
| 6,111,336 A | * | 8/2000 | Yoshida et al. | 310/328 |
| 6,140,750 A | * | 10/2000 | Ueyama | 310/369 |
| 6,331,747 B2 | * | 12/2001 | Yoshida et al. | 310/313 R |
| 6,512,321 B2 | * | 1/2003 | Yoshida et al. | 310/316.01 |
| 6,528,926 B2 | * | 3/2003 | Okamoto et al. | 310/323.17 |

FOREIGN PATENT DOCUMENTS

JP    05-151580 A    6/1993

\* cited by examiner

*Primary Examiner*—Burton S. Mullins
*Assistant Examiner*—J. Aguirrechea
(74) *Attorney, Agent, or Firm*—Sidley Austin Brown & Wood LLP (57) ABSTRACT

An actuator using vibration caused by a piezoelectric element. The actuator includes: an driving rod bonded to one of the piezoelectric element; a engaging member for engaging frictionally with the driving rod; and a control circuit for applying the piezoelectric element with a driving voltage. The control circuit is provided with a drive circuit which generates a first set of the driving voltage for driving the engaging member, and with a friction reducing circuit which generates a second set of the driving voltage for reducing a frictional force exerting between the driving rod and the engaging member.

19 Claims, 11 Drawing Sheets

Fig.7A VELOCITY OF MOVING BODY

Fig.7B EFFECT OF REDUCING FRICTIONAL FORCE

DRIVE MECHANISM EMPLOYING ELECTROMECHANICAL TRANSDUCER AND METHOD FOR CONTROLLING THE DRIVE MECHANISM

This application is based upon application No. 2001-13048 filed in Japan, the contents of which are hereby incorporated by reference.

BACKGROUND OF THE INVENTION

1. Field of the Invention

The present invention relates to a drive mechanism employing an electromechanical transducer and a method for controlling the drive mechanism, and more particularly to the drive mechanism which uses a piezoelectric element or another electromechanical transducer, such as the drive mechanism which is preferably used for driving a lens mechanism for a camera, or a precision stage and the method for controlling the drive mechanism.

2. Description of the Related Arts

Japanese Non-examined Laid-Open Patent Publication No. 5-151580 discloses a frictional force reduction mechanism using a piezoelectric element. The publication teaches a technique in which a linear motor is used for driving an optical head in an optical disk apparatus, and the frictional force reduction mechanism is used in a guiding portion of the motor.

In the disclosed technique, a separate actuator is employed for moving a moving body, and hence the production cost increases, and the extra space is necessary.

SUMMARY OF THE INVENTION

Accordingly, it is an object of the present invention to provide a drive mechanism employing an electromechanical transducer, in which a frictional force can be controlled by a simple configuration. Also, it is another object of the present invention to provide a method for controlling the drive mechanism.

In order to achieve the above object, according to one aspect of the present invention, there is provided a drive mechanism, comprising: an electromechanical transducer having a pair of ends in an extending and contracting direction; a drive member fixed to one of the pair of ends of the electromechanical transducer; a driven member which is driven by the drive member and which contacts frictionally with the drive member under a predetermined frictional force exerting therebetween; and a controller for supplying the electromechanical transducer with drive pulses, wherein the controller includes a driving circuit which generates a first set of the drive pulses for driving the driven member, and includes a frictional force reducing circuit which generates a second set of the drive pulses for reducing a frictional force exerting between the drive member and the driven member.

In the above configuration, for example, a piezoelectric element, an electrostriction element, or the like may be used as the electromechanical transducer. The first set of driving pulses which is generated by the driving circuit is applied to the electromechanical transducer to extend and contract the electromechanical transducer, whereby the drive member is driven at different velocities depending on the direction to move the driven member which contacts frictionally with the drive member under a predetermined frictional force, along the drive member. On the other hand, the second set of driving pulses which is generated by the frictional force reduction circuit is similarly applied to the electromechanical transducer to extend and contract the electromechanical transducer, whereby the drive member is driven, for example, at a substantially same velocity in both the directions, so that the frictional force between the driven member and the drive member can be reduced while preventing the driven member from being substantially moved with respect to the drive member.

According to the configuration, the driven member can be moved or the frictional force can be reduced by a simple structure using a single element. Therefore, the production cost can be lowered, and the space can be reduced.

The drive mechanism of the invention can be specifically configured in various manners as described below.

As an embodiment, the second set of the drive pulses generated by the frictional force reducing circuit have sinusoidal waveforms.

According to the configuration, even when the drive member is moved by supplying the second set of driving pulses which is sinusoidal to the electromechanical transducer, the frictional force with the drive member can be reduced without causing the driven member not to be substantially moved with respect to the drive member. Because of the use of the sinusoidal waveforms, the frictional force reduction circuit can be configured in a relatively simple manner, and the energy loss can be reduced.

As an embodiment, the frictional force reducing circuit is arranged to change at least one of a frequency and an amplitude of the sinusoidal waveforms of the second set of the drive pulses so as to adjust the reducing amount of the frictional force exerting between the drive member and the driven member.

A configuration in which the frequency and/or amplitude of the sinusoidal waveforms are adjustable can be easily realized.

As an embodiment, the drive pulses supplied to the electromechanical transducer by the controller have rectangular waveforms.

According to the configuration, in accordance with the duty ratio of the rectangular waveforms, for example, the drive member can be driven at different velocities depending on the direction, or the drive member can be driven at a substantially same velocity in both the directions. Therefore, the driven member can be moved, or the frictional force between the driven member and the drive member can be reduced.

As an embodiment, the drive pulses supplied to the transducer by the controller have rectangular waveforms, and the controller is arranged to change a duty ratio of the rectangular waveforms thereof, so that the controller is allowed to drive the driven member and to reduce the frictional force exerting between the drive member and the driven member.

According to the configuration, the effect of reducing the frictional force can be selected by adequately adjusting the duty ratio of the rectangular driving pulses. When the duty ratio is switched over at intervals of several periods, for example, the frictional force can be reduced more effectively. Furthermore, the driving circuit can be used also as the frictional force reduction circuit.

Moreover, a lever device such as a control lever or a joy stick in which a lever member may be driven by using the driving device of the invention is provided.

Usually, a lever member must be held to the same position unless the member is operated, and is requested to be smoothly moved when the lever is to be operated. In some lever members, the holding force and the operational feeling during an operation process are requested to appear in different manners depending on the situation. In some cases, the lever member is requested to be automatically operated.

According to the configuration, the state of the driven member is changed into movement, frictional force reduction, or fixation by changing the driving pulses which is supplied by the controller, whereby automatic/manual/stop modes of the lever member can be easily switched over.

As an embodiment, the drive mechanism further comprises a charge mechanism in which a spring extending and contracting in a moving direction of the driven member is disposed, and in which the spring is charged by movement of the driven member.

According to the configuration, the driven member serves also as the charge mechanism, and hence the space for the device can be reduced. The spring may be precharged by movement of the driven member. When a moving body is to be moved in the opposite direction, the force of the spring can be used in addition to the operation of the drive mechanism, whereby a high-speed movement of the driven member can be realized.

As an embodiment, the drive mechanism can be used for driving a shutter mechanism.

For example, a shutter of a camera is requested to quickly respond in a shutter releasing process. When a shutter mechanism is realized by mechanical means, a delay of several tens to several hundreds of milliseconds is inevitably produced. According to the configuration described above, it is possible to configure a shutter mechanism which can respond without producing a time lag as described above. Moreover, the shutter speed can be enhanced.

In order to achieve the above object, according to another aspect of the present invention, there is provided a drive controlling method for controlling a drive mechanism which comprises: an electromechanical transducer having a pair of ends in an extending and contracting direction; a drive member fixed to one of the pair of ends of the electromechanical transducer; and a driven member which is driven by the drive member and which contacts frictionally with the drive member under a predetermined frictional force exerting therebetween, the drive controlling method comprising the steps of: generating drive pulses; and supplying the electromechanical transducer with the drive pulses, wherein a mode in which the driven member is moved, a mode in which a frictional force between the driven member and the drive member is reduced, and a mode in which the driven member rests relative to the drive member are switched over by changing waveforms of the drive pulses.

According to the method, the driving of the driven member, and the frictional force between the driven member and the drive member can be controlled by changing waveforms of the driving pulses.

As an embodiment, the drive pulses have sinusoidal waveforms.

As an embodiment, the reducing amount of a frictional force exerting between the drive member and the driven member is adjusted by changing at least one of the frequency and the amplitude of the sinusoidal waveforms of the drive pulses.

As an embodiment, the drive pulses have rectangular waveforms.

As an embodiment, a duty ratio of the rectangular waveforms of the drive pulses is changed so as to drive the driven member and so as to reduce a frictional force exerting between the drive member and the driven member.

According to the embodiment, the driving of the driven member, and the frictional force between the driven member and the drive member can be controlled by changing the duty ratio of the rectangular driving pulses.

BRIEF DESCRIPTION OF THE DRAWINGS

These and other objects and features of the present invention will become clear from the following description taken in conjunction with the preferred embodiments thereof with reference to the accompanying drawings.

DETAILED DESCRIPTION OF THE PREFERRED EMBODIMENTS

Before the description of each of the preferred embodiments according to the present invention proceeds, it is to be noted that like or corresponding parts are designated by like reference numerals throughout the accompanying drawings.

Figure 1A:
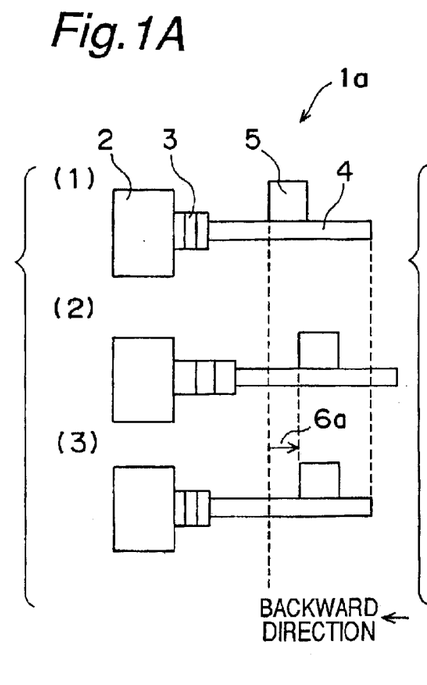
FIG. 1A is a view illustrating the operation principle of a drive mechanism of an element-fixed type.
Figure 1B:
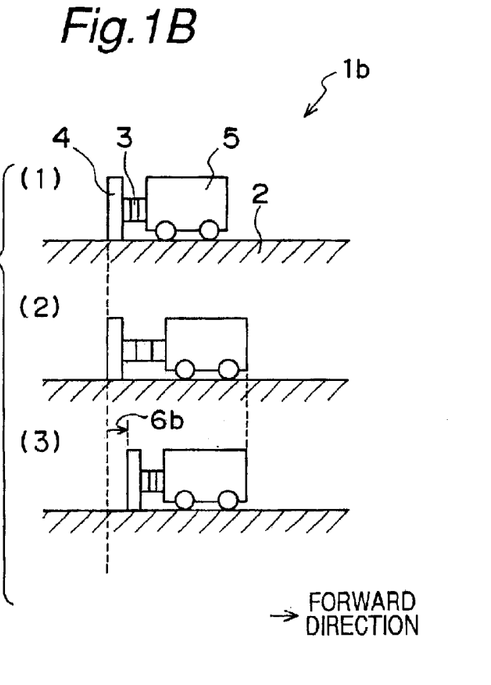
FIG. 1B is a view illustrating the operation principle of a drive mechanism of a self-propelled type.
Figure 1C:
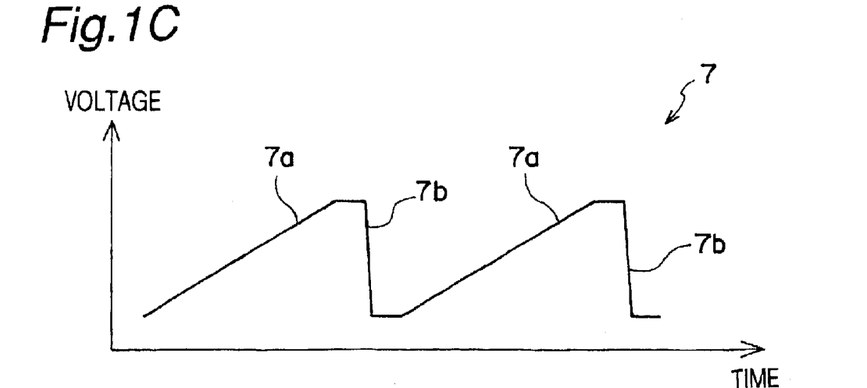
FIG. 1C is a waveform chart of a set of driving pulses.

First, the operation principle of a drive mechanism which uses an electromechanical transducer will be described. FIG. 1 is a view illustrating the operation principle of such a drive mechanism.

In a drive mechanism 1a of an element-fixed type shown in FIG. 1A, one end of a piezoelectric element or electromechanical transducer 3 is connected to an end portion of a drive member 4, and the other end of the element is connected to a fixed member 2. A moving body or driven member 5 is engaged with the drive member 4 by a frictional force so as to be slidable along the drive member 4.

A set of driving pulses, which are output for example from a controller 7 (shown in FIG. 2A) and which has, for example, a saw-tooth waveform as shown in FIG. 1C is applied or supplied to the piezoelectric element 3 of the drive mechanism 1a. When the set of the driving pulses is gradually changed as indicated by 7a, the piezoelectric element 3 extends and the drive member 4 is moved in the forward direction. In accordance with this movement, the moving body 5 is moved together with the drive member 4 (FIG. 1A(2)).

When the set of the driving pulses is abruptly changed as indicated by a reference numeral 7b, the piezoelectric element 3 abruptly contracts and the drive member 4 is rapidly moved in the backward direction (FIG. 1A(3)). At this time, the moving body 5 overcomes the friction with the drive member 4 to stay at the present position or not to be moved. As a result, the moving body is moved in the forward direction with respect to the drive member 4 as indicated by an arrow 6a.

In a drive mechanism 1b of a self-propelled type shown in FIG. 1B, an end of a piezoelectric element 3 in an extending and contracting direction is connected to a moving body 5, and the other end of the element is connected to a drive member 4. The drive member 4 is frictionally engaged with a fixed member 2 so as to be movable along the fixed member 2.

A set of driving pulses which has, for example, a saw-tooth waveform as shown in FIG. 1C is applied to the piezoelectric element 3 of the drive mechanism 1b. When the set of the driving pulses is gradually changed as indicated by 7a in the same manner as described above, the piezoelectric element 3 extends and the drive member 4 is not moved because of the friction with the fixed member. In accordance with this, the moving body 5 is moved in the forward direction (FIG. 1B(2)).

When the set of the driving pulses is abruptly changed as indicated by the reference numeral 7b, the piezoelectric element 3 abruptly contracts, the moving body 5 stays at the present position, and the drive member 4 overcomes the friction with the fixed member 2 to be moved in the forward direction as indicated by an arrow 6b. As a result, the moving body 5 is moved in the forward direction (FIG. 1B(3)).

Figure 2A:
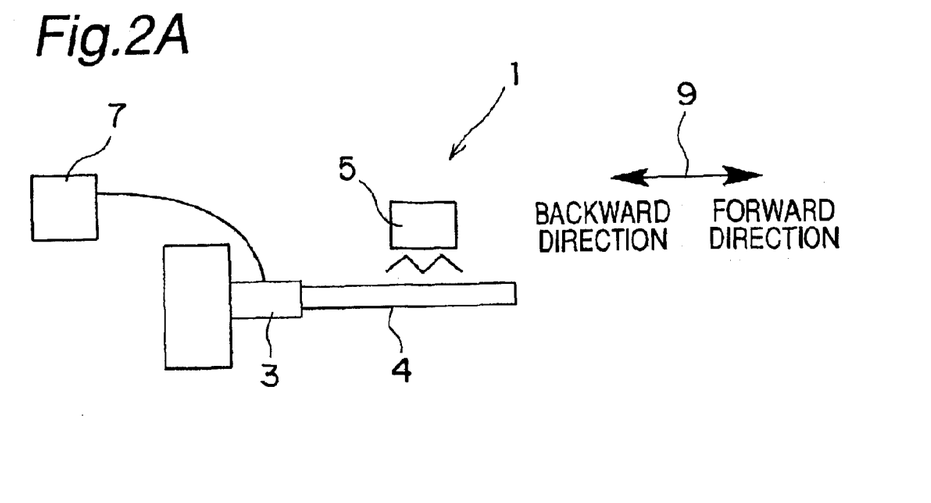
FIG. 2A is a diagram of the drive mechanism of the invention.

FIG. 2A is a view illustrating the drive mechanism of the embodiment.

The drive mechanism 1 is of the element-fixed type. A driving shaft 4 which serves as a drive member is connected to an end of a piezoelectric element 3 in an extending and contracting direction. A moving body 5 which serves as an driven member is frictionally engaged with the driving shaft 4. The moving body 5 can be axially moved along the driving shaft 4. A controller 7 is connected to the piezoelectric element 3. When a set of generated driving pulses is applied, the piezoelectric element 3 extends or contracts in accordance with the voltage in a backward or forward direction 9.

The controller 7 is configured so as to change the generated driving pulses. As described later, the driving pulses can be changed to a first set of driving pulses for moving the moving body 5, and also to a second set of driving pulses for reducing a frictional force between the moving body 5 and the driving shaft 4.

Figure 2B:
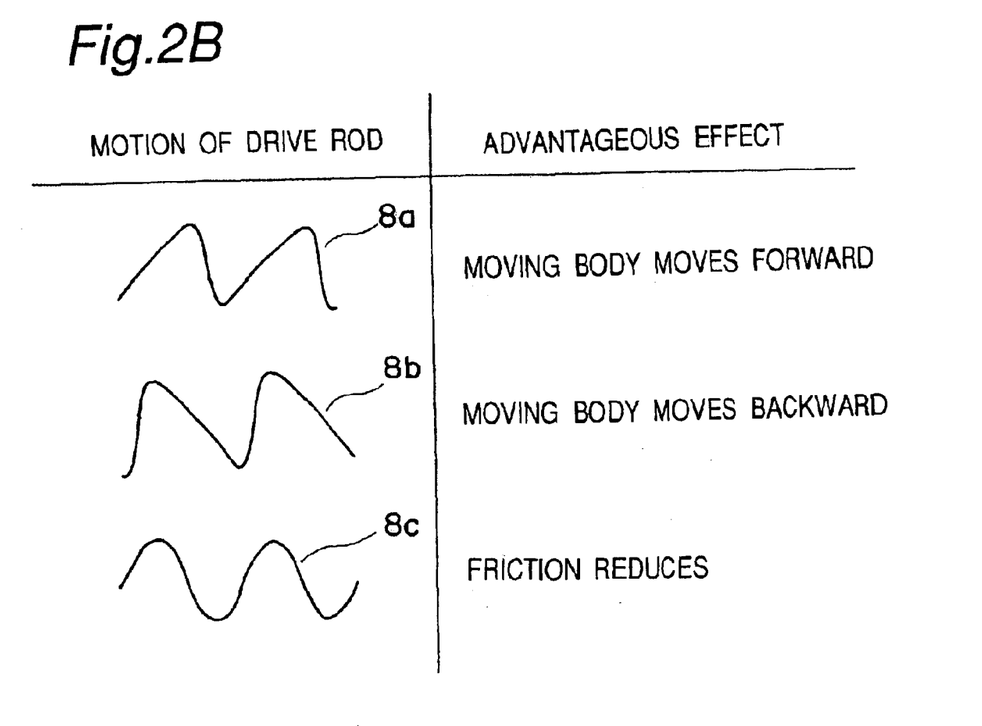
FIG. 2B is a view illustrating driving of the drive mechanism of the invention.

FIG. 2B is a view illustrating driving of the drive mechanism of the invention. An example of the first set of driving pulses is a saw-tooth voltage. When a set of driving pulses of the saw-tooth waveform is applied to the piezoelectric element 3, the piezoelectric element 3 is displaced in accordance with the waveform of the set of the driving pulses, and the driving shaft 4 is displaced in the saw-tooth waveform 8a or 8b, whereby the moving body 5 is moved. Specifically, when the piezoelectric element conducts vibration having saw-tooth displacements in which the piezoelectric element slowly extends and abruptly contracts, also the driving shaft 4 conducts similar motion 8a, and the moving body 5 repeats "non-slipping" and "slipping" according to the above-described principle, with the result that the moving body 5 is moved in the direction of "+". In contrast with this, when the piezoelectric element 3 conducts vibration having saw-tooth displacements in which the piezoelectric element abruptly extends and slowly contracts, also the driving shaft 4 conducts similar motion 8b, and the moving body 5 repeats "slipping" and "non-slipping", with the result that the moving body 5 is moved in the direction of "−".

An example of the second set of driving pulses is a sinusoidal voltage. When a set of driving pulses of the sinusoidal waveform is applied to the piezoelectric element 3, the piezoelectric element 3 is displaced in accordance with the waveform of the driving pulses so that the displacement amount exhibits a sinusoidal waveform 8c. In accordance with this displacement, also the driving shaft 4 similarly vibrates. As a result, the frictional force between the moving body 5 and the driving shaft 4 is reduced.

Figure 3A:
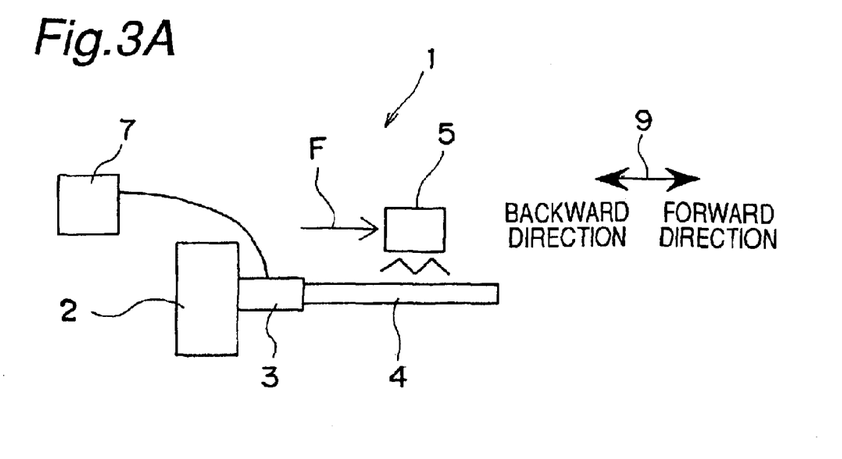
FIG. 3A is the diagram of the drive mechanism.

FIG. 3A is a view illustrating the effect of reducing the frictional force. The figure shows a force F which is required for forcedly displacing the moving body 5 when a force in the direction of "+" is applied to the moving body of the drive mechanism having the configuration shown in FIG. 3A. The ordinate of FIG. 3B indicates the force required for forcedly displacing the moving body 5. In the graph, the symbol "×" indicates a forced displacement in the direction of "+", and the symbol "o" indicates a forced displacement in the direction of "−". When the driving shaft 4 does not vibrate, i.e., when the vibration of the driving shaft has the waveform indicated by the reference numeral 8s, the force required for moving the moving body 5 in either of the directions of "+" and "−" is Fs as indicated by 9s and 9s'. This force is referred to as the set frictional force. When the driving shaft 4 vibrates in a sinusoidal waveform indicated by 8t, the force required for moving the moving body is smaller than the set frictional force Fs, and reduced in both the directions of "+" and "−" as indicated by 9t and 9t'. When the amplitude of the sinusoidal wave of the driving shaft 4 is increased as indicated by 8u, the force required for moving the moving body is further reduced as indicated by 9u and 9u', so that the effect of reducing the frictional force can be further enhanced. When the frequency of the vibration of the driving shaft 4 is raised as indicated by 8v, the force required for moving the moving body is further reduced as indicated by 9v and 9v', so that the effect of reducing the frictional force can be further enhanced.

Figure 3B:
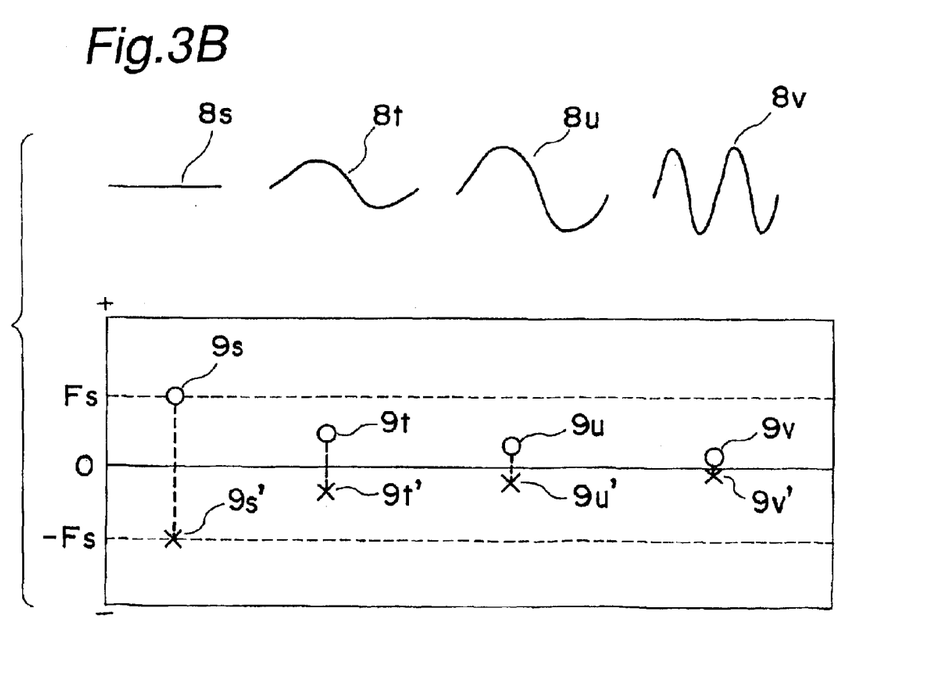
FIG. 3B is a view illustrating an effect of reducing a frictional force.

Provision of a circuit which changes the frequency and/or amplitude of a sinusoidal waveform in controller 7 enhances the above-mentioned effect of reducing the frictional force, and therefore, a frictional force with the driving shaft 4 can be adjusted.

Figure 4A:
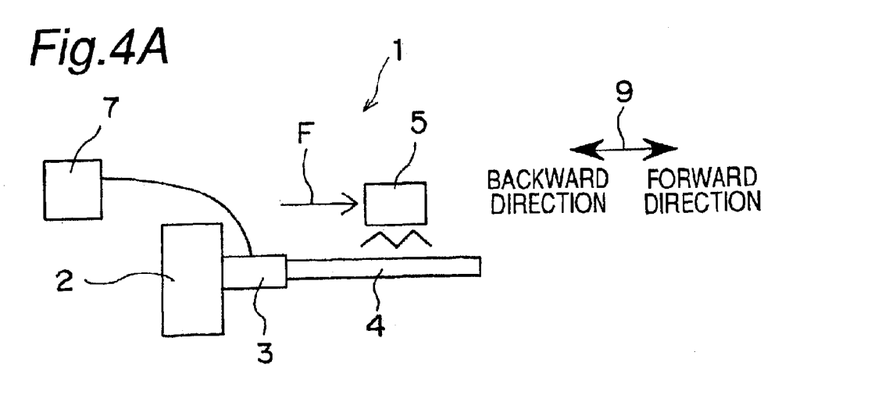
FIG. 4A is the diagram of the drive mechanism.

FIG. 4A is the diagram of the drive mechanism. The effect of reducing the frictional force is realized not only when the driving shaft 4 vibrates in a sinusoidal waveform, but also when the driving shaft vibrates in an approximately saw-tooth waveform such as that shown in FIG. 4B. When the driving shaft conducts vibration of an approximately saw-tooth waveform in which the driving shaft slowly extends and abruptly contracts as indicated by 8x, for example, the moving body 5 is moved in the direction of "+". During a period when the driving shaft 4 slowly extends, the moving body can be moved in the direction of "+" by a force which is smaller than the force Fs that is required during a non-vibrating period as indicated by 9x. As described above, when the driving shaft 4 abruptly contracts, the moving body 5 is moved in the direction of "+" because of slippage with respect to the driving shaft 4, and hence the moving body cannot be forcedly displaced.

Figure 4B:
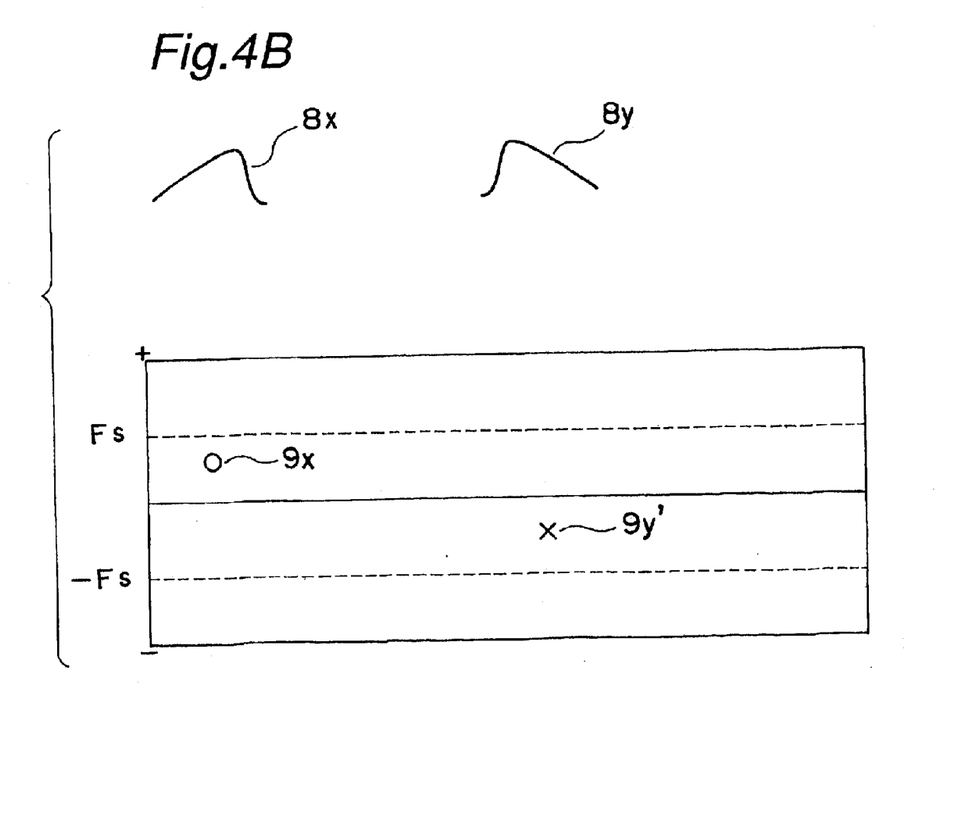
FIG. 4B is a view illustrating an effect of reducing a frictional force.

By contrast, when the driving shaft conducts vibration 8y of an approximately saw-tooth waveform in which the driving shaft abruptly extends and slowly contracts, the moving body 5 is moved in the direction of "−". During a period when the driving shaft 4 slowly contracts, the moving body can be moved in the direction of "−" by a force which is smaller than the force Fs that is required during a non-vibrating period as indicated by 9y'. When the driving shaft 4 abruptly extends, the moving body 5 is moved in the direction of "−" because of slippage with respect to the driving shaft 4, and hence the moving body cannot be forcedly displaced.

Figure 5:
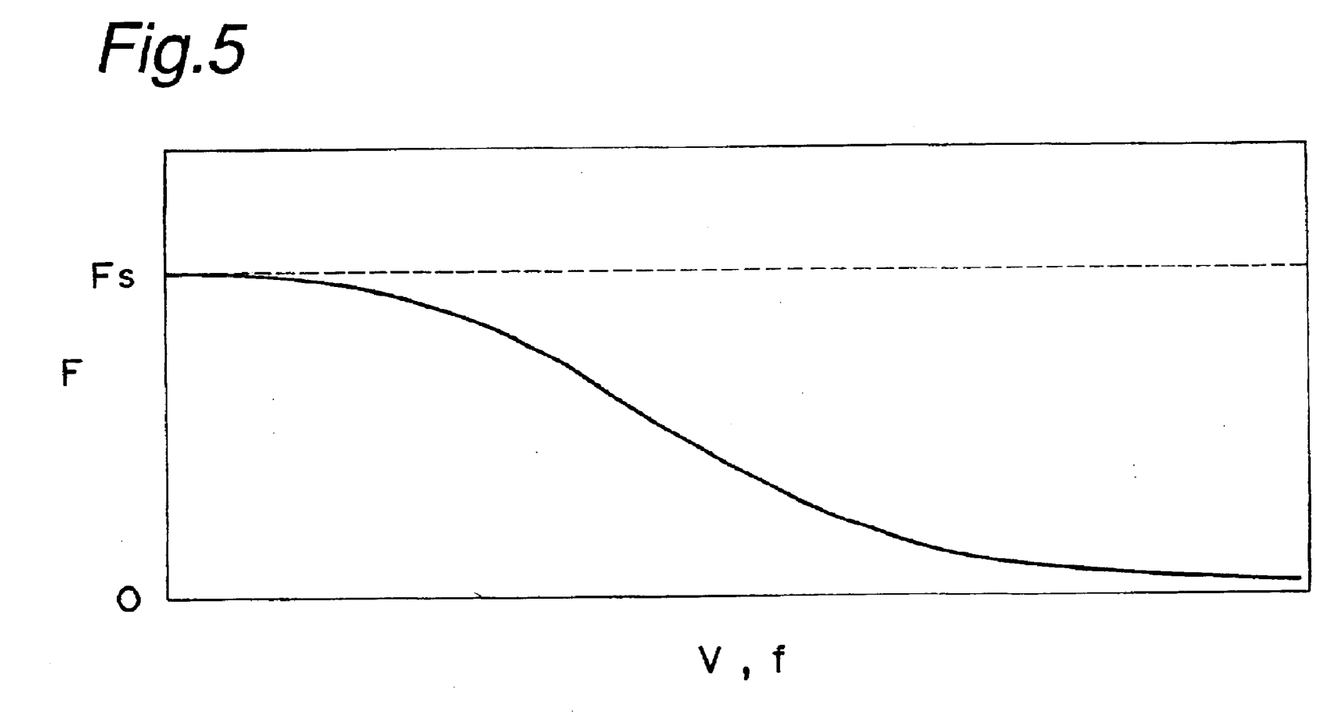
FIG. 5 is a graph showing a relationship between a voltage V applied to a controller and a frequency f, and a force F required for forcedly displacing a moving body in the case where a driving shaft vibrates in the form of a sinusoidal displacement.

FIG. 5 shows a relationship between the voltage V applied to the controller 7 and the frequency f, and the force F required for forcedly displacing the moving body 5 in the case where the driving shaft vibrates in the form of a sinusoidal displacement. As apparent from FIG. 5, as the voltage V applied to the controller 7 is higher, i.e., as the amplitude of the sinusoidal displacement of the driving shaft 4 is larger, the force required for forcedly displacing the moving body 5 is further reduced. Therefore, the frictional force between the moving body 5 and the driving shaft 4 can be controlled by the voltage applied to the controller 7, i.e., the amplitude of the sinusoidal displacement of the driving shaft 4. Also the relationship between the frequency f of the sinusoidal displacement of the driving shaft and the force required for forcedly displacing the moving body 5 is similar to that described above. Therefore, the frictional force between the moving body 5 and the driving shaft 4 can be controlled by the frequency of the sinusoidal displacement of the driving shaft.

Figure 6:
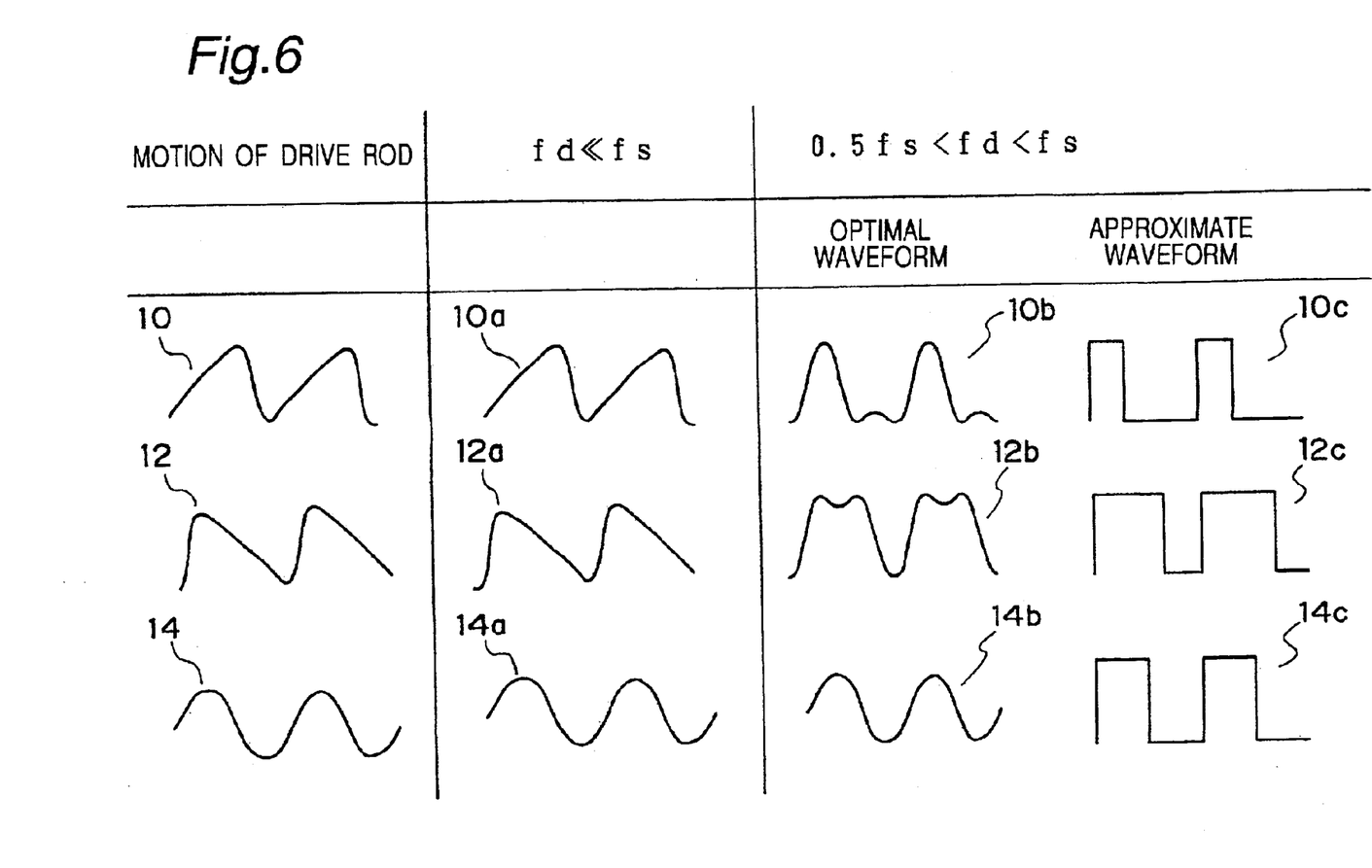
FIG. 6 is a view showing voltage waveforms which are applied to a piezoelectric element for causing the driving shaft to perform a saw-tooth displacement and a sinusoidal displacement.

FIG. 6 shows voltage waveforms which are applied to the piezoelectric element for causing the driving shaft to perform a saw-tooth displacement and a sinusoidal displacement. When the driving pulses are applied to the piezoelectric element 3 as described above, the piezoelectric element 3 produces displacements in accordance with the waveform of the driving pulses. At this time, when the frequency fd of the voltage waveform is sufficiently lower than the resonance frequency fs of the piezoelectric element 3, displacements of saw-tooth waveforms such as indicated by 10 and 12 and a sinusoidal waveform such as indicated by 14 can be obtained by applying driving pulses of waveforms (10a, 12a, and 14a) which are similar to the waveforms, respectively.

In order to cause the driving shaft to perform the sinusoidal displacement 14, a sinusoidal voltage 14b irrespective of the driving frequency fd is applied thereto. In the case of saw-tooth displacements (10 and 12), when the driving frequency fd is raised to enter the range of 0.5 fs<fd<fs, however, the voltage waveform which is to be applied to the piezoelectric element 3 is hardly obtained by a saw-tooth waveform. The waveform of the voltage which is to be applied to the piezoelectric element 3 is changed in this way because the voltage/displacement transfer function of a piezoelectric element depends on the frequency. In this case, the optimal waveform of the voltage pulse which is to be applied to the piezoelectric element is the wave form by 10b or 12b. An effect which is substantially identical with that in the case where the optimal waveform 10b or 12b or the sinusoidal waveform 14b is applied to the piezoelectric element 3 can be attained by using a rectangular voltage 10c, 12c, or 14c in which the duty ratio is approximately adjusted. As a result, the controller can generate a set of driving pulses of a rectangular waveform, and both effects of movements of the moving body 5 in different directions, and reduction of a frictional force can be attained by applying the driving pulses in which the duty ratio is adjusted, to the piezoelectric element.

Figure 7A:
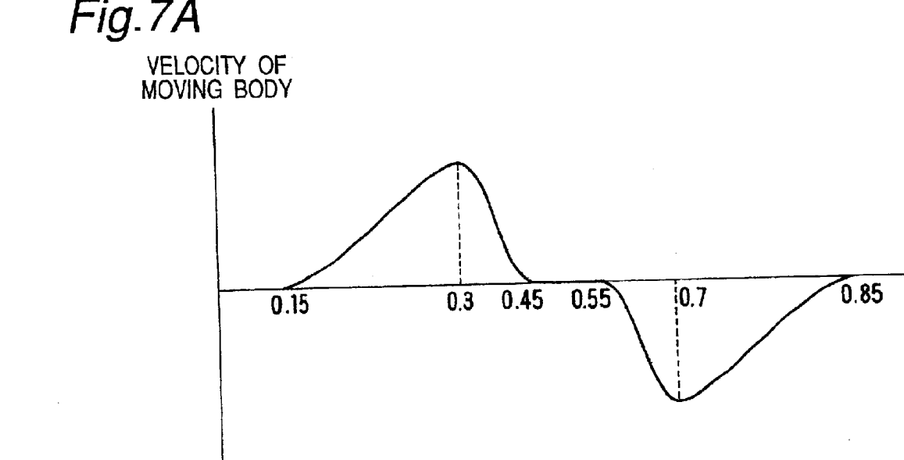
FIG. 7A is a graph showing a relationship between the velocity of a moving body and a duty ratio.
Figure 7B:
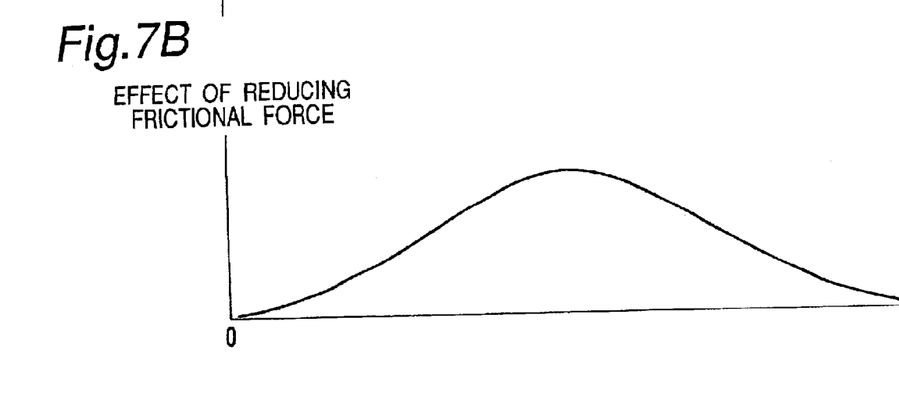
FIG. 7B is a graph showing a relationship between the effect of reducing a frictional force and the duty ratio.
Figure 8A:
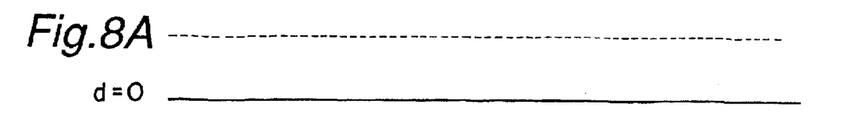
FIGS. 8A to 8G are views showing rectangular voltages which are actually used in a drive mechanism of the embodiment.
Figure 8B:
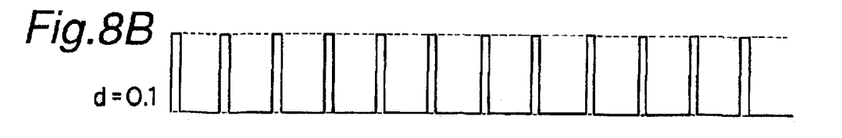
Figure 8C:
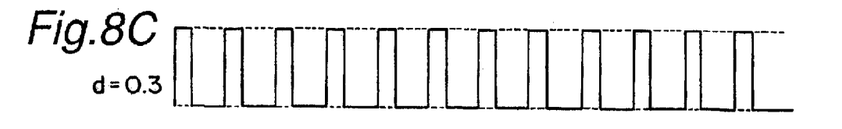
Figure 8D:
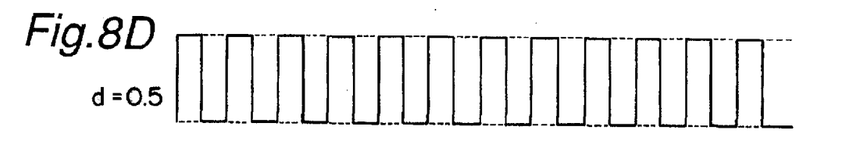
Figure 8E:
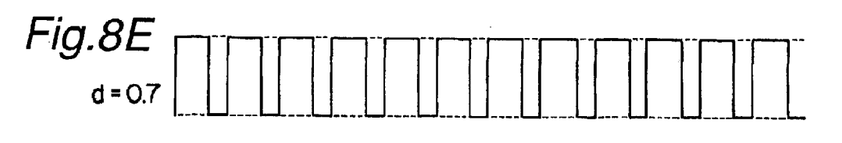
Figure 8F:
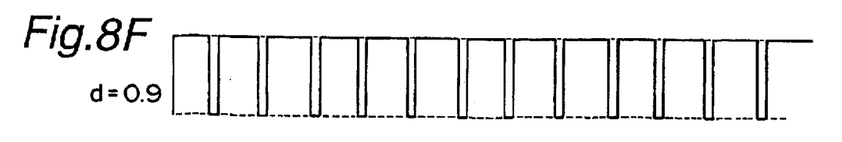
Figure 8G:
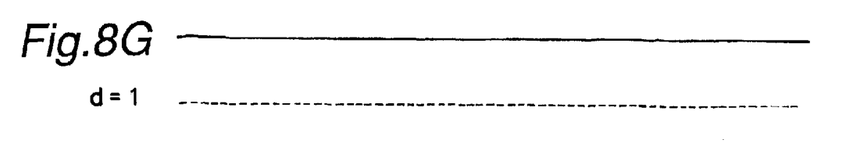

FIGS. 7A and 7B show a relationship between the velocity of the moving body and the effect of reducing the frictional force, and the duty ratio. As shown in FIG. 7A, when the duty ratio exceeds 0.15, for example, the moving body begins to be moved in the direction of "+", and, when the duty ratio is 0.3, the movement velocity of the moving body in the direction of "+" is maximum. When the duty ratio is further increased, the movement velocity is abruptly reduced. When the duty ratio is 0.45, movement of the moving body is 0. When the duty ratio exceeds 0.55, the moving body begins to be moved in the direction of "−", and, when the duty ratio is 0.7, the movement velocity of the moving body in the direction of "−" is maximum. When the duty ratio is further increased, the movement velocity is abruptly reduced. When the duty ratio is 0.85 or more, movement of the moving body is 0.

As shown in FIG. 7B, the effect of reducing the frictional force is further enhanced as the duty ratio is further increased, and is maximum when the duty ratio is about 0.5. Thereafter, the effect is further reduced as the duty ratio is further increased.

When the controller 7 generates rectangular driving pulses of different duty ratios, therefore, the moving body can be moved, and the frictional force between the moving body 5 and the driving shaft 4 can be reduced. When the controller has a function of, pulse conversion which can change the duty ratio of a rectangular waveform, the movement velocity and the frictional force with the driving shaft 4 can be adjusted.

Rectangular voltages which are actually used in the drive mechanism are specifically shown in FIGS. 8A–8G. In the figure, each numeral value indicates the value of the duty ratio d. The waveform of FIG. 8A in which the duty ratio d is equal to 0 can be used, for example, in the case where the moving body is not to be moved, and the frictional force is to be kept large. The waveform of FIG. 8B in which the duty ratio d is equal to 0.1 can be used, for example, in the case where the moving body is not to be moved, and the frictional force is to be slightly reduced. The waveform of FIG. 8C in which the duty ratio d is equal to 0.3 can be used, for example, in the case where the moving body is to be moved in the direction of "+". The waveform of FIG. 8D in which the duty ratio d is equal to 0.5 can be used, for example, in the case where the moving body is not to be moved, and the frictional force is to be largely reduced. The waveform of FIG. 8E in which the duty ratio d is equal to 0.7 can be used, for example, in the case where the moving body is to be moved in the direction of "−". The waveform of FIG. 8F in which the duty ratio d is equal to 0.9 can be used, for example, in the case where the moving body is not to be moved, and the frictional force is to be slightly reduced. The waveform of FIG. 8G in which the duty ratio d is equal to 1 can be used, for example, in the case where the moving body is not to be moved, and the frictional force is to be kept large.

Figure 9A:
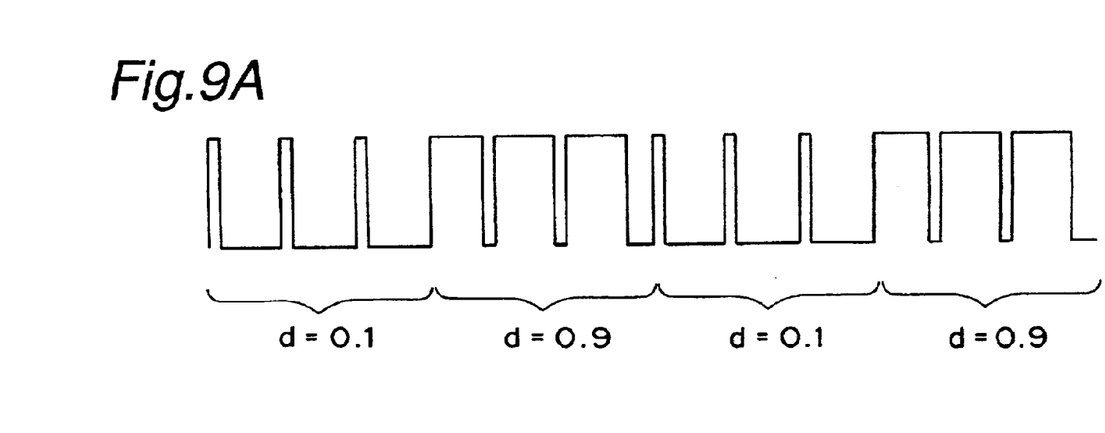
FIGS. 9A and 9B are views showing examples of a set of driving pulses in which the duty ratio is switched.
Figure 9B:
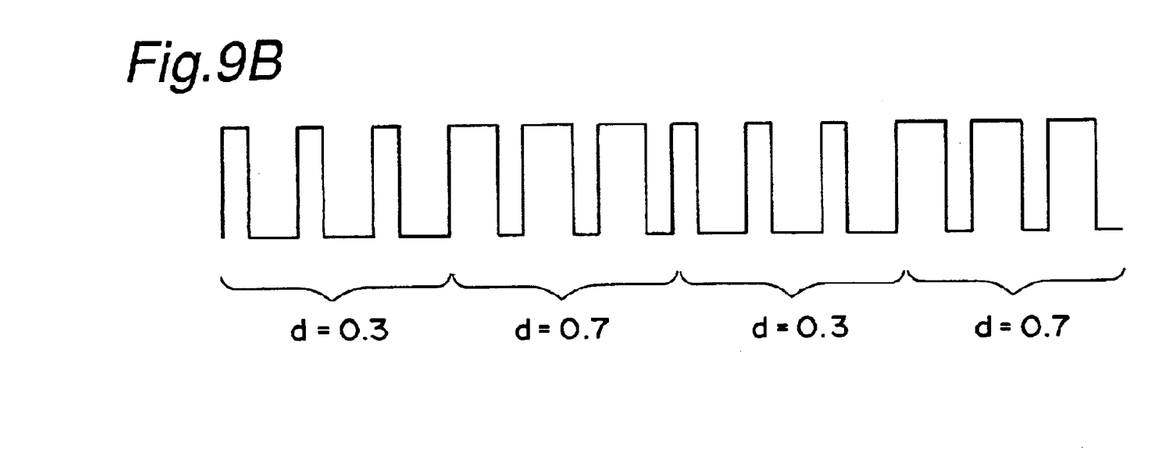

In the case where the duty ratio is 0.1 or 0.9 which is in a range of larger or smaller values, the frictional force is differentiated depending on the direction. When the duty ratio is 0.1, for example, the degree of reduction of the frictional force in the direction of "+" is larger, and that in the direction of "−" is smaller. FIGS. 9A and 9B show means for canceling this phenomenon.

In a set of driving pulses shown in FIG. 9A, the duty ratio is switched over between 0.1 and 0.6 at intervals of several pulses. When the set of driving pulses of this waveform is applied to the piezoelectric element, the frictional force with the driving shaft can be reduced irrespective of the direction.

When driving pulses of duty ratios of 0.3 and 0.7 are alternately switched over as shown in FIG. 9B, the frictional force can be reduced by a medium degree. In this case, as described above, the moving body 5 is moved from a microscopic viewpoint. When the switchover is conducted at intervals of several pulses so as to shorten the movement distance, however, the moving body looks to be still from a macroscopic viewpoint, and the frictional force can be reduced by a medium degree.

Figure 10A:
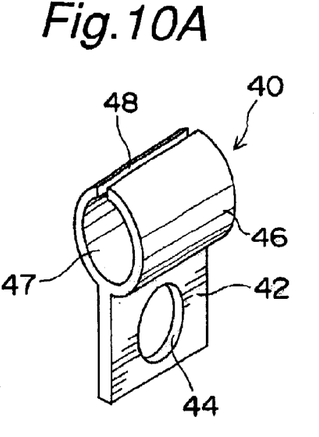
FIG. 10A is a perspective view of a moving body of a drive mechanism.
Figure 10B:
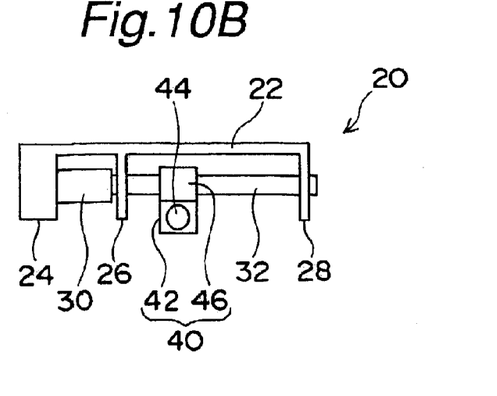
FIG. 10B is a diagram of the drive mechanism.

FIGS. 10A–10D show examples in which the drive mechanism 1 is applied to a control lever of a lever mechanism. As shown in FIG. 10B, in a drive mechanism 20, a driving shaft or drive member 32 is fixed to an end of a piezoelectric element 30, and a moving body or driven member 40 is frictionally engaged with the driving shaft 32. A fixing member 24 is coupled with another end of the piezoelectric element 30 in order to fix the piezoelectric element. The driving shaft 32 is inserted through and supported by small holes formed in walls 26 and 28 so that the driving shaft is supported to be axially movable. The fixing member 24, and the walls 26 and 28 are connected to one another by a connecting member 22. When a set of driving pulses is applied to the piezoelectric element 30, the driving shaft 32 is caused to vibrate by vibration of the piezoelectric element, and the moving body 40 can be moved or the frictional force between the moving body 40 and the driving shaft 32 can be reduced in accordance with the waveform of the driving pulses.

As show in FIG. 10A, the moving body 40 has support portions 46 and 48 in order to be frictionally engaged with the driving shaft 32. The support portions 46 and 48 are urged in mutually opposite directions, and clampingly frictionally engaged with the driving shaft 32 which is passed through a communication hole 47 formed between the two support portions 46 and 48. A small piece 42 is disposed on the support portions, and a small hole 44 into which a projection 58 disposed on a lever shaft 56 is to be passed is formed in the piece.

Figure 10C:
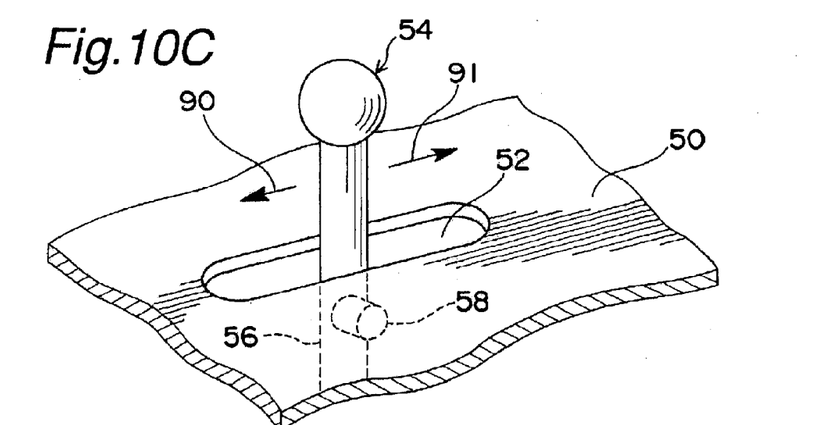
FIG. 10C is a perspective view showing a main portion of a lever mechanism.

As shown in FIG. 10C, the lever 54 has a structure in which the projection 58 is disposed on the shaft 56. The lever 54 can be linearly moved among operation positions. The lever 54 is movable only in the directions of arrows 90 and 91 along an oblong hole 52 formed in a plate 50.

Figure 10D:
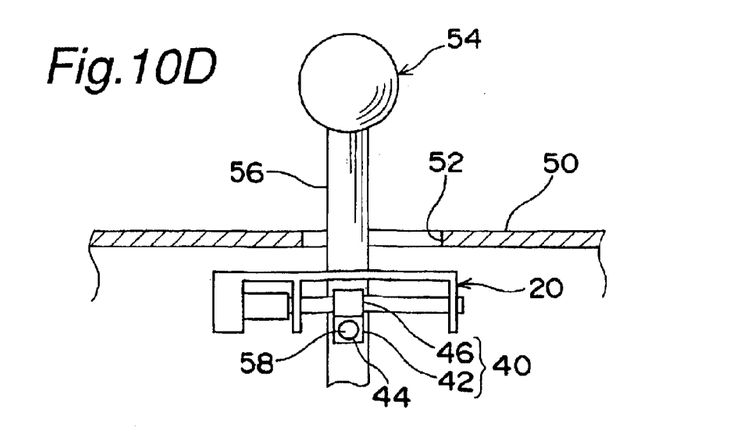
FIG. 10D is a diagram of the lever mechanism.

As shown in FIG. 10D, the lever mechanism of the embodiment has a structure in which the projection 58 disposed on the shaft 56 of the lever 54 is passed through the small hole 44 formed in the small piece 42 of the moving body 40 of the drive mechanism 20. The drive mechanism 20 is fixed to the lower side of the plate 50. Since the lever 54 is coupled with the moving body 40, the movement of the lever 54 along the oblong hole 52 is interlocked with that of the moving body 40 along the driving shaft.

Usually, a control lever must be held at the same position unless the lever is operated, and is required to be smoothly moved when the lever is to be operated. In some levers, the holding force and the operational feeling during an operation process are required to appear in different manners depending on the situation. In some cases, the lever is required to be automatically operated.

In the lever mechanism of the embodiment, automatic/manual/stop modes of the lever can be easily switched over by using vibration of the driving shaft 32. When the lever is to be automatically operated, the set of the driving pulses is required to be applied to the piezoelectric element 30 so that the driving shaft 32 is displaced in a saw-tooth shape. When the saw-tooth shape is changed as described above, the direction in which the moving body 40 moves, i.e., that of the lever, can be switched over. When the lever is to be manually operated, the set of the driving pulses is required to be applied to the piezoelectric element 30 so that the driving shaft 32 is displaced in, for example, a sinusoidal shape. When the driving shaft is caused to vibrate in this way, the frictional force can be reduced, and the lever can be smoothly moved. In order to adjust the operational feeling of the lever, the frictional force between the moving body 40 and the driving shaft 32 is adjusted. As described above, this adjustment can be easily conducted by changing the waveform of the vibration of the driving shaft 32, or by stopping the vibration. When the lever is to be stopped, the set of the driving pulses is not applied to the piezoelectric element 30, and the moving body 40 is held by the frictional force with the driving shaft 32.

Figure 11A:
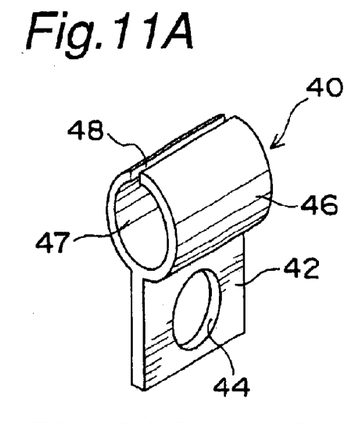
FIG. 11A is a perspective view of a moving body of a drive mechanism.
Figure 11B:
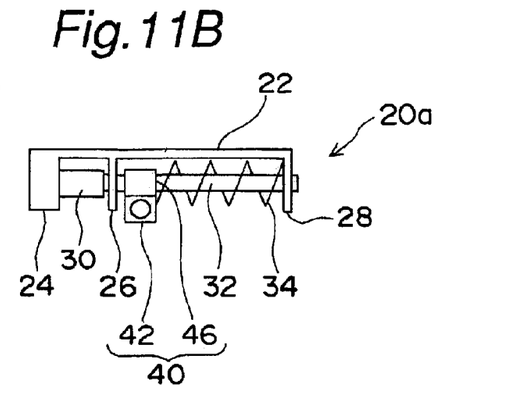
FIG. 11B is a diagram of the drive mechanism.

FIGS. 11A–11H shows an example examples in which the drive mechanism 1 is applied to a shutter mechanism of a camera. The shutter mechanism has a coil spring, a spring-charging actuator, and an engagement portion which constitutes a shutter. Among these components, the spring-charging actuator and the engagement portion are configured by the drive mechanism. As shown in FIG. 11B, in a drive mechanism 20a, a driving shaft or drive member 32 is fixed to an end of a piezoelectric element 30, and a moving body or driven member 40 is frictionally engaged with the driving shaft 32. A fixing member 24 is coupled with another end of the piezoelectric element 30 in order to fix the piezoelectric element. The driving shaft 32 is inserted through and supported by small holes formed in walls 26 and 28 so that the driving shaft is supported to be axially movable. The fixing member 24, and the walls 26 and 28 are connected to one another by a connecting member 22. A coil spring 34 is disposed in the periphery of the driving shaft 32. One end of the spring is connected to the wall 28, and the other end to the moving body 40. When a set of driving pulses is applied to the piezoelectric element 30, the driving shaft 32 is caused to vibrate by vibration of the piezoelectric element, and the moving body 40 can be moved or the frictional force between the moving body 40 and the driving shaft 32 can be reduced in accordance with the waveform of the driving pulses. When the moving body 40 is moved toward the wall 28, the coil spring 34 contracts in accordance with the movement of the moving body 40, and the coil spring is charged. Under the state where the coil spring is charged, the set of the driving pulses is applied to the piezoelectric element to move the moving body 40 toward the wall 26 or reduce the frictional force with the driving shaft 32. As a result, the moving body 40 can be moved at a high speed by the force exerted by the charged coil spring 34.

As show in FIG. 11A, the moving body 40 has support portions 46 and 48 in order to be frictionally engaged with the driving shaft 32. The support portions 46 and 48 are urged in mutually opposite directions, and clampingly frictionally engaged with the driving shaft 32 which is passed through a communication hole 47 formed between the two support portions 46 and 48. A small piece 42 is disposed on the support portions, and a small hole 44 for fixing light shield plates 62 and 64 are formed in the piece.

The shutter mechanism uses two drive mechanisms 20a and 20a'. The light shield plates 62 and 64 of the shutter are fixed to the moving bodies of the drive mechanisms, respectively. Each of the light shield plates 62 and 64 has a size which can block an optical path 60 of a lens. The drive mechanisms 20a and 20a' are respectively placed perpendicular to the optical path 60 at different levels which are different from each other by a degree that is slightly smaller than the height of the light shield plates 62 and 64 fixed to the respective devices, in order to place the light shield plates with partly overlapping each other.

Figure 11C:
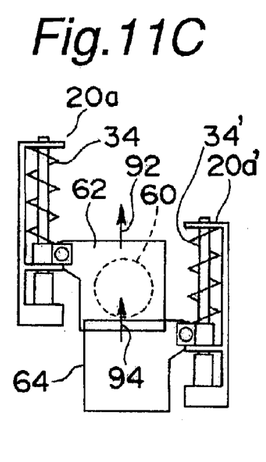
FIGS. 11C to 11H are diagrams of a shutter mechanism of a camera to which the drive mechanism is applied.

Next, the operation of the shutter will be described with reference to FIGS. 11C to 11H. FIG. 11C shows a state where an operation of charging the shutter is started. In order to upward move the moving bodies of the drive mechanisms 20a and 20a' at the same speed, a set of driving pulses which causes the driving shafts to perform a saw-tooth vibration is applied to the piezoelectric elements of both the drive mechanisms. As a result, also the light shield plates 62 and 64 are upward moved as indicated by the arrows 92 and 94. The coil springs 34 and 34' disposed on the driving shafts are charged in accordance with movements of the moving bodies.

Figure 11D:
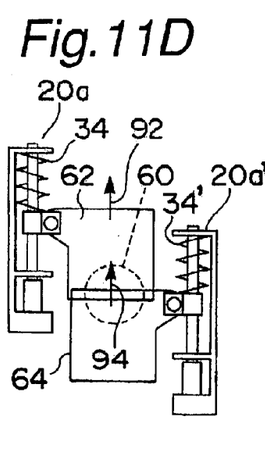

FIG. 11D shows an intermediate state of the upward movements of the moving bodies. Since the two light shield plates 62 and 64 partly overlap each other, the optical path 60 is not opened during the movement process.

Figure 11E:
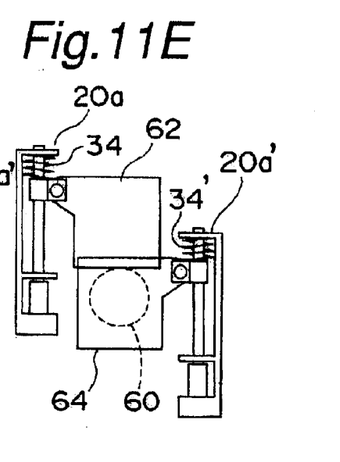

FIG. 11E shows a state where the upward movements of the moving bodies are ended. When the moving bodies are moved to the upper side, the application of the driving pulses to the piezoelectric elements of the drive mechanisms 20a and 20a' is stopped. Under this state, each of the moving body is held at its position by the frictional force between the moving body and the driving shaft, so that the optical path of the shutter is closed.

Figure 11F:
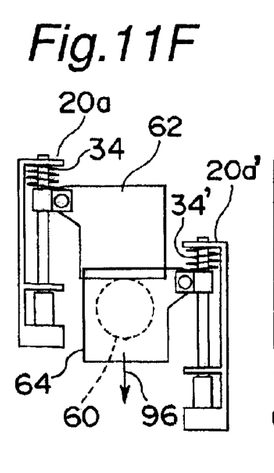

FIG. 11F shows a state immediately before the optical path of the shutter mechanism is opened. In this state, a set of driving pulses is applied to the piezoelectric element of the drive mechanism 20a' to give the driving shaft a saw-tooth vibration which causes the moving body to be downward moved, or to give the driving shaft a sinusoidal vibration. Then, the moving body begins to be downward moved at a high speed by the force of the charged coil spring 34' as indicated by the arrow 96, and the light shield plate 64 is moved in accordance with this movement.

Figure 11G:
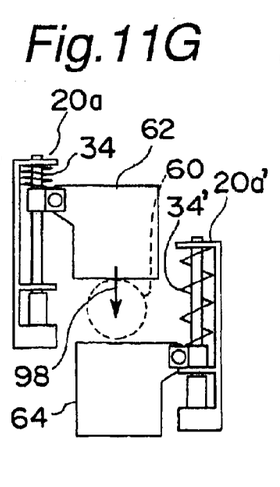

FIG. 11G shows a state where the optical path of the shutter is opened. As a result of the downward movement of the light shield plate due to the movement of the moving body of the drive mechanism 20a', the optical path 60 of the shutter is opened. Thereafter, a set of driving pulses is similarly applied to the piezoelectric element of the drive mechanism 20a. Then, the moving body begins to be downward moved at a high speed as indicated by the arrow 98, and the light shield plate 62 is moved in accordance with this movement.

Figure 11H:
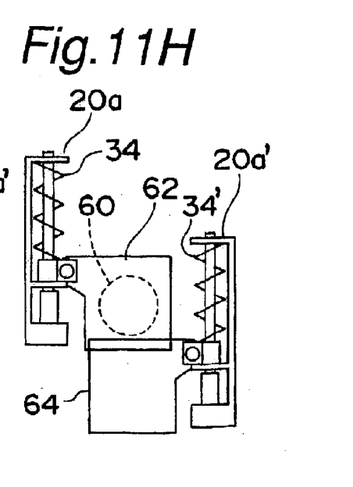

FIG. 11H shows a state where the optical path of the shutter is closed. When the downward movement of the light shield plate 62 is ended, the optical path 60 of the shutter is closed by the light shield plate 62.

In the shutter mechanism, the components are employed for double purposes, and the frictional force can be reduced by electrical means. Therefore, the frictional force can be cancelled without producing a time lag, and the response is rapid.

Although the present invention has been fully described in connection with the preferred embodiment thereof with reference to the accompanying drawings, it is to be noted that various changes and modifications are also apparent to those skilled in the art.

What is claimed is:

1. A drive mechanism, comprising:
   an electromechanical transducer having a pair of ends in an extending and contracting direction;
   a drive member fixed to one of the pair of ends of the electromechanical transducer;
   a driven member which is driven by the drive member and which contacts frictionally with the drive member under a predetermined frictional force exerting therebetween; and
   a controller for supplying the electromechanical transducer with drive pulses, wherein the controller includes a driving circuit which generates a first set of the drive pulses for driving the driven member, and includes a frictional force reducing circuit which generates a second set of the drive pulses for reducing a frictional force exerting between the drive member and the driven member.

2. A drive mechanism as claimed in claim 1, wherein the second set of the drive pulses generated by the frictional force reducing circuit have sinusoidal waveforms.

3. A drive mechanism as claimed in claim 2, wherein the frictional force reducing circuit is arranged to change at least one of a frequency and an amplitude of the sinusoidal waveforms of the second set of the drive pulses so as to adjust the reducing amount of the frictional force exerting between the drive member and the driven member.

4. A drive mechanism as claimed in claim 1, wherein the drive pulses supplied to the electromechanical transducer by the controller have rectangular waveforms.

5. A drive mechanism as claimed in claim 1, wherein the drive pulses supplied to the transducer by the controller have rectangular waveforms, and wherein the controller is arranged to change a duty ratio of the rectangular waveforms thereof, so that the controller is allowed to drive the driven member and to reduce the frictional force exerting between the drive member and the driven member.

6. A drive mechanism as claimed in claim 1, further comprising a lever member drivingly connected to said driven member so as to thereby form a lever device.

7. A drive mechanism as claimed in claim 1, further comprising a charge mechanism in which a spring extending and contracting in a moving direction of the driven member is disposed, and in which the spring is charged by movement of the driven member.

8. A drive mechanism as claimed in claim 7, further comprising a shutter mechanism drivingly connected to said driven member.

9. A drive controlling method for controlling a drive mechanism which comprises:
   an electromechanical transducer having a pair of ends in an extending and contracting direction;

a drive member fixed to one of the pair of ends of the electromechanical transducer; and a driven member which is driven by the drive member and which contacts frictionally with the drive member under a predetermined frictional force exerting therebetween, the drive controlling method comprising the steps of:

generating drive pulses; and supplying the electromechanical transducer with the drive pulses, wherein a mode in which the driven member is moved, a mode in which a frictional force between the driven member and the drive member is reduced, and a mode in which the driven member rests relative to the drive member are switched over by changing waveforms of the drive pulses.

10. A drive controlling method as claimed in claim 9, wherein the drive pulses have sinusoidal waveforms.

11. A drive controlling method as claimed in claim 10, wherein the reducing amount of a frictional force exerting between the drive member and the driven member is adjusted by changing at least one of the frequency and the amplitude of the sinusoidal waveforms of the drive pulses.

12. A drive controlling method as claimed in claim 9, wherein the drive pulses have rectangular waveforms.

13. A drive controlling method as claimed in claim 12, wherein a duty ratio of the rectangular waveforms of the drive pulses is changed so as to drive the driven member and so as to reduce a frictional force exerting between the drive member and the driven member.

14. A method for controlling a drive mechanism, said drive mechanism including an electromechanical transducer, a drive member fixed to the electromechanical transducer, and a driven member frictionally coupled to said drive member, the controlling method comprising the steps of:

selectively generating one of a first mode of drive pulses and a second mode of drive pulses; and supplying the electromechanical transducer with the drive pulses;

wherein said first mode of drive pulses are adapted to cause the driven member to be driven relative to the drive member and said second mode of drive pulses are adapted to reduce a frictional force between the driven member and the drive member, said first mode and said second mode being selectively invoked by changing waveforms of the drive pulses.

15. A method for controlling a drive mechanism in accordance with claim 14, wherein said first mode of drive pulses are adapted to cause the driven member to be driven in an extending and contracting direction relative to the drive member, a velocity of said drive member in an extending direction being different than a velocity of said drive member in a contracting direction so as to move the driven member along the drive member.

16. A method for controlling a drive mechanism in accordance with claim 15, wherein said second mode of drive pulses are adapted to cause the driven member to be driven in an extending and contracting direction relative to the drive member, a velocity of said drive member in an extending direction being substantially equal to a velocity of said drive member in a contracting direction so as to reduce a frictional force between said drive member and said driven member while preventing said driven member from being substantially moved with respect to the drive member.

17. A drive mechanism, comprising:

a transducer capable of extending and contracting;

a drive member fixed to said transducer;

a driven member frictionally coupled to said drive member; and a controller adapted to supply the transducer with drive pulses, said pulses including:

a first mode of pulses for actuating said transducer in a first manner so as to cause a first mode of motion of said drive member suitable for inducing a net relative movement between said drive member and said driven member, and a second mode of pulses for actuating said transducer in a second manner so as to cause a second mode of motion of said drive member suitable for reducing a frictional force between said driven member and said drive member without inducing a net relative movement therebetween.

18. A drive mechanism in accordance with claim 17, wherein said first mode of pulses actuates said transducer in a manner to move the drive member in accordance with an extension and contraction of the transducer, a velocity of said drive member in an extending direction being different than a velocity of said drive member in a contracting direction so as to move the driven member along the drive member.

19. A drive mechanism in accordance with claim 17, wherein said second mode of pulses actuates said transducer in a manner to move the drive member in accordance with an extension and contraction of the transducer, a velocity of said drive member in an extending direction being substantially equal to a velocity of said drive member in a contracting direction so as to reduce a frictional force between said drive member and said driven member while preventing said driven member from being substantially moved with respect to the drive member.

* * * * *